United States Patent
Kim et al.

(10) Patent No.: US 7,019,805 B2
(45) Date of Patent: Mar. 28, 2006

(54) LIQUID CRYSTAL DISPLAY DEVICE HAVING A MULTI-DOMAIN STRUCTURE AND A MANUFACTURING METHOD FOR THE SAME

(75) Inventors: Do-Sung Kim, Gumi-si (KR); Do-Yeon Kim, Busan (KR)

(73) Assignee: LG.Philips LCD Co., Ltd., Seoul (KR)

( * ) Notice: Subject to any disclaimer, the term of this patent is extended or adjusted under 35 U.S.C. 154(b) by 47 days.

(21) Appl. No.: 10/658,385

(22) Filed: Sep. 10, 2003

(65) Prior Publication Data

US 2004/0125253 A1   Jul. 1, 2004

(30) Foreign Application Priority Data

Dec. 31, 2002 (KR) ............... 10-2002-0088065
Dec. 31, 2002 (KR) ............... 10-2002-0088288

(51) Int. Cl.
*G02F 1/1337* (2006.01)
*G02F 1/343* (2006.01)

(52) U.S. Cl. ............... 349/129; 349/139; 349/144; 349/160; 349/191

(58) Field of Classification Search ............... 349/54, 349/55, 129, 139, 144, 160, 191, 192
See application file for complete search history.

(56) References Cited

U.S. PATENT DOCUMENTS

| | | | |
|---|---|---|---|
| 4,691,995 A | 9/1987 | Yamazaki et al. | |
| 5,309,264 A | 5/1994 | Lien et al. | |
| 5,608,556 A | 3/1997 | Koma | |
| 5,666,179 A | 9/1997 | Koma | |
| 6,100,953 A | 8/2000 | Kim et al. | |
| 6,300,996 B1 * | 10/2001 | Matsuyama et al. | 349/144 |
| 2001/0019391 A1 * | 9/2001 | Kim et al. | 349/139 |
| 2002/0097364 A1 * | 7/2002 | Kwon et al. | 349/139 |

FOREIGN PATENT DOCUMENTS

| | | |
|---|---|---|
| EP | 884626 A2 | 12/1998 |
| JP | 06-235925 | 8/1994 |
| JP | 08-101395 | 4/1996 |
| JP | 09-061829 | 3/1997 |
| JP | 10-177178 | 6/1998 |
| JP | 10-333157 | 12/1998 |
| JP | 10-333159 | 12/1998 |
| JP | 10-133438 | 5/1999 |

(Continued)

OTHER PUBLICATIONS

Y. Tanaka et al.; "Late-News Paper: A New Design to Improve Performance and Simplify the Manufacturing Process of High-Quality MVA TFT-LCD Panels"; SID 99 DIGEST; pp. 206-209.

*Primary Examiner*—Andrew Schechter
(74) *Attorney, Agent, or Firm*—McKenna Long & Aldridge LLP

(57) ABSTRACT

A liquid crystal display device includes a first substrate having a plurality of pixel regions, a plurality of gate and data lines on the first substrate, a thin film transistor at a crossing portion of the gate and data lines, a first auxiliary electrode under the data line, a plurality of second auxiliary electrodes in a horizontal direction of the pixel region, a pixel electrode in the pixel region, a plurality of protrusions on a second substrate, the protrusions being formed between the second auxiliary electrodes, and a liquid crystal layer between the first and second substrates.

36 Claims, 15 Drawing Sheets

FOREIGN PATENT DOCUMENTS

| | | |
|---|---|---|
| JP | 11-142864 | 5/1999 |
| JP | 11-248930 | 9/1999 |
| JP | 11-326922 | 11/1999 |
| WO | WO 00/08521 | 2/2000 |

\* cited by examiner

LIQUID CRYSTAL DISPLAY DEVICE HAVING A MULTI-DOMAIN STRUCTURE AND A MANUFACTURING METHOD FOR THE SAME

This application claims the benefit of Korean Patent Application No. 2002-88065, filed on Dec. 31, 2002 in Korea, and Korean Patent Application No. 88288, filed on Dec. 31, 2002, which are both hereby incorporated by reference for all purposes as if fully set forth herein.

BACKGROUND OF THE INVENTION

1. Field of the Invention

The present invention relates to a liquid crystal display (LCD) device and more particularly, to a liquid crystal display (LCD) device having a multi-domain structure for improving a viewing angle.

2. Discussion of the Related Art

In general, a liquid crystal display (LCD) device utilizes an optical anisotropy and birefringence properties of liquid crystal molecules to display images. The liquid crystal display (LCD) device usually has first and second substrates spaced apart from and opposing each other. The first and second substrates respectively have electrodes for forming an electric field between the electrodes. That is, if voltage is applied to the electrodes of the liquid crystal display (LCD) device, an electric field is formed between the electrodes and the electric field changes alignments of the liquid crystal molecules. The changed alignments of the liquid crystal molecules control a light transmittance through the liquid crystal and thus images can be displayed by controlling the light transmittance through the liquid crystal.

FIG. 1 is an exploded perspective view of a related art liquid crystal display (LCD) device. In FIG. 1, a liquid crystal display (LCD) device 11 has an upper substrate 5 having a color filter 7 and a common electrode 18 on the color filter 7, and a lower substrate 22 having a thin film transistor "T" and a pixel electrode 17 connected to the thin film transistor "T". The color filter 7 has sub-color filters 8 and a black matrix 6 formed between sub-color filters 8. A plurality of pixel regions "P" is defined on the lower substrate 22 and array lines are formed around the pixel region "P". Liquid crystal 14 is interposed between the upper and lower substrates 5 and 22. A gate line 13 is formed in a first direction. A data line 15 is formed in a second direction perpendicular to the first direction. The gate and data lines 13 and 15 define the pixel region "P" by crossing each other, and the thin film transistor "T" is formed near a crossing portion of the gate and data lines 13 and 15. The thin film transistors "T" are formed in a matrix form on the lower substrate 22, i.e., an array substrate. The pixel electrode 17 is formed of transparent conductive metal material such as indium tin oxide (ITO) in the pixel region "P". A storage capacitor C connected to the pixel electrode 17 in parallel is formed over the gate line 13. A portion of the gate line 13 serves as a first storage electrode and a source-drain metal layer formed of same material as source and drain electrodes on a same layer as the source and drain electrodes serves as a second storage electrode. The source-drain metal layer contacts the pixel electrode 17 to receive a signal from the pixel electrode 17. Because liquid crystal molecules align by an electric field formed between the common and pixel electrodes 18 and 17, the liquid crystal display (LCD) device (specifically TN (twisted nematic) mode liquid crystal display (LCD) device) has a poor viewing angle. To overcome the aforementioned problem, a method to improve a viewing angle by dividing the pixel region into many domains where the liquid crystal molecules in one of the domains have a symmetric orientation to the orientation of the liquid crystal molecules in a next domain, has been suggested. A structure of the liquid crystal display (LCD) device to improve the viewing angle will be described hereinafter with reference to FIG. 2 and FIG. 3.

FIG. 2 is a plan view of a related art liquid crystal display (LCD) device having a multi-domain structure, and FIG. 3 is a cross-sectional view taken along a line "III— III" in FIG. 2. In FIG. 2 and FIG. 3, a first substrate 50 and a second substrate 70 opposing the first substrate 50 are spaced apart from each other. Gate and data lines 52 and 54 defining a pixel region "P" by crossing each other are formed on the first substrate 50, and a thin film transistor "T" having a gate electrode 56, an active layer 58, a source electrode 60 and a drain electrode 62 are formed near a crossing portion of the gate and data lines 52 and 54. A pixel electrode 64 connected to the drain electrode 62 is formed in the pixel region "P", and a side electrode 66 encompassing the pixel electrode 64 is formed around the pixel electrode 64. A black matrix 72 corresponding to the thin film transistor "T", the gate line 52, the data line 54 and the side electrode 66 is formed on the second substrate 70. A color filter having sub-color filters 74a, 74b and 74c respectively for red (R), green (G) and blue (B) colors is formed on the second substrate 70 and covers the black matrix 72. A common electrode 76 is formed on the color filter, and an organic layer pattern 78 having a certain width is formed on the common electrode 76 in a same direction as the gate line 52. The organic layer pattern 78 and the side electrode 66 serves to form a fringe field for forming an abnormal electric field between the common and pixel electrodes 76 and 64. The organic layer pattern 78 divides the pixel region "P" into a first domain "A" and a second domain "B". Accordingly, because liquid crystal molecules 80 in the first domain "A" has a different alignment direction from the liquid crystal molecules in the second domain "B", it is not required to perform a rubbing process twice to form a multi-domain in the pixel region "P". However, because the side electrode 66 is formed of the same material as the pixel electrode 64 on a same layer as the pixel electrode 64, a short between the side electrode 66 and the pixel electrode 64 may happen when there is an error during forming process of the side electrode 66 and the pixel electrode 64. Accordingly, to overcome the aforementioned problem, an appropriate interval must be provided between the side electrode 66 and the pixel electrode 64. However, as the interval between the side electrode 66 and the pixel electrode 64 increases, an aperture ratio is greatly reduced.

In addition, the liquid crystal display (LCD) device having a multi-domain structure can be more stably driven as the number of divided domains in the pixel region increases. However, because many slit patterns must be used to divide the pixel region into many domains, the aperture ratio may be decreased greatly.

SUMMARY OF THE INVENTION

Accordingly, the present invention is directed to a liquid crystal display device and a manufacturing method for the same that substantially obviates one or more of problems due to limitations and disadvantages of the related art.

An advantage of the present invention is to provide a liquid crystal display (LCD) device having auxiliary electrodes under a data line and in a pixel region to form a multi-domain structure in the pixel region for improving a viewing angle and to use a portion of the auxiliary electrodes as a repair line when the data line is broken.

Another advantage of the present invention is to provide a method for manufacturing a liquid crystal display (LCD) device having auxiliary electrodes under a data line and in a pixel region to form a multi-domain structure in the pixel region for improving a viewing angle and to use a portion of the auxiliary electrodes as a repair line when the data line is broken.

Another advantage of the present invention is to provide an array substrate for a liquid crystal display (LCD) device in which a pixel region has first and second regions and only the second region is divided into a plurality of domains owing to an auxiliary electrode having a zigzag pattern, slits and a protrusion around the second region to improve a viewing angle.

Another advantage of the present invention is to provide a method for manufacturing an array substrate for a liquid crystal display (LCD) device in which a pixel region has first and second regions and only the second region is divided into a plurality of domains owing to an auxiliary electrode having a zigzag pattern, slits and a protrusion around the second region to improve a viewing angle.

Another advantage of the present invention is to provide a liquid crystal display (LCD) device in which a pixel region has first and second regions and only the second region is divided into a plurality of domains owing to an auxiliary electrode having a zigzag pattern, slits and a protrusion around the second region to improve a viewing angle.

Another advantage of the present invention is to provide a method for manufacturing a liquid crystal display (LCD) device in which a pixel region has first and second regions and only the second region is divided into a plurality of domains owing to an auxiliary electrode having a zigzag pattern, slits and a protrusion around the second region to improve a viewing angle.

Another advantage of the present invention is to provide a liquid crystal display (LCD) device in which a pixel region has first and second regions and only the second region is divided into a plurality of domains owing to an auxiliary electrode having a plurality of horizontal electrodes and a vertical electrode, slits corresponding to the horizontal electrodes, and a protrusion between the slits to improve a viewing angle.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device comprises a first substrate having a plurality of pixel regions, a plurality of gate and data lines on the first substrate, a thin film transistor at a crossing portion of the gate and data lines, a first auxiliary electrode under the data line, a plurality of second auxiliary electrodes in a horizontal direction of the pixel region, a pixel electrode in the pixel region, a plurality of protrusions on a second substrate, the protrusions being formed between the second auxiliary electrodes, and a liquid crystal layer between the first and second substrates.

In another aspect of the present invention, a method for manufacturing a liquid crystal display (LCD) device, comprises forming a plurality of gate lines on the first substrate in a first direction, the first substrate having a plurality of pixel regions, forming a plurality of data lines on the first substrate in a second direction, forming a thin film transistor having a gate electrode, an active layer, a source electrode and a drain electrode near a crossing portion of the gate and data lines, forming a first auxiliary electrode and a plurality of second auxiliary electrodes on the first substrate, the first auxiliary electrode having first and second portions spaced apart from each other under the data line, the second auxiliary electrode connecting the second portion of the first auxiliary electrode to a first portion of another first auxiliary electrode under an adjacent data line, and forming a plurality of protrusions on a second substrate, the protrusions being formed between the second auxiliary electrodes, and forming a liquid crystal layer between the first and second substrates.

In another aspect of the present invention, an array substrate for a liquid crystal display device comprises a substrate having a plurality of pixel regions, the pixel region having first and second regions, a plurality of gate and data lines crossing each other on the substrate, a thin film transistor having a gate electrode, a semiconductor layer, a source electrode and a drain electrode at a crossing portion of the gate and data lines, an auxiliary electrode having a plurality of portions in the second region of the pixel region, and a pixel electrode in the pixel region, the pixel electrode having at least one slit corresponding to the portion of the auxiliary electrode.

In another aspect of the present invention, a method for manufacturing an array substrate for a liquid crystal display device comprises forming a substrate having a plurality of pixel regions, the pixel region having first and second regions, forming a plurality of gate and data lines crossing each other on the substrate, forming a thin film transistor having a gate electrode, a semiconductor layer, a source electrode and a drain electrode at a crossing portion of the gate and data lines, forming an auxiliary electrode having a plurality of portions in the second region of the pixel region, and forming a pixel electrode in the pixel region, the pixel electrode having at least one slit corresponding to the portion of the auxiliary electrode.

In another aspect of the present invention, a liquid crystal display device comprises a first substrate having a plurality of pixel regions, the pixel region having first and second regions, a plurality of gate and data lines crossing each other on the first substrate, a thin film transistor having a gate electrode, a semiconductor layer, a source electrode and a drain electrode at a crossing portion of the gate and data lines, an auxiliary electrode having a plurality of portions in the second region of the pixel region, a pixel electrode in the pixel region, the pixel electrode having at least one slit corresponding to the portion of the auxiliary electrode, a black matrix layer on a second substrate, a color filter layer on the black matrix layer, a common electrode on the color filter layer, and a protrusion on the common electrode, the protrusion being formed around the second region and in the second region at positions corresponding to the portions of the auxiliary electrode that does not correspond to the slit.

In another aspect of the present invention, a method for manufacturing a liquid crystal display device comprises forming a first substrate having a plurality of pixel regions, the pixel region having first and second regions, forming a plurality of gate and data lines crossing each other on the first substrate, forming a thin film transistor having a gate electrode, a semiconductor layer, a source electrode and a drain electrode at a crossing portion of the gate and data lines, forming an auxiliary electrode having a plurality of portions in the second region of the pixel region, forming a pixel electrode in the pixel region, the pixel electrode having at least one slit corresponding to the portion of the auxiliary electrode, forming a black matrix layer on a second substrate, forming a color filter layer on the black matrix layer, forming a common electrode on the color filter layer, and forming a protrusion on the common electrode, the protrusion being formed around the second region and in the second region at positions corresponding to the portions of the auxiliary electrode that does not correspond to the slit.

In another aspect of the present invention, a liquid crystal display device comprises a first substrate having a plurality of pixel regions, the pixel region having first and second regions, a plurality of gate and data lines crossing each other on the first substrate, a thin film transistor having a gate electrode, a semiconductor layer, a source electrode and a drain electrode at a crossing portion of the gate and data lines, an auxiliary electrode having a plurality of horizontal electrodes and a vertical electrode, the horizontal electrodes being formed in the second region and spaced apart from each other, and the vertical electrode being formed under the data line and connecting the plurality of horizontal electrodes.

In another aspect of the present invention, a pixel electrode in the pixel region, the pixel electrode having slits corresponding to the horizontal electrode, a black matrix layer on a second substrate, a color filter layer on the black matrix layer, a common electrode on the color filter layer, and a protrusion on the common electrode, the protrusion being formed in a diagonal direction at a space between the slits.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiment of the present invention, which is illustrated in the accompanying drawings. In the present description, the terms "horizontal" and "vertical" are meant to be relative terms and not to limit the physical design of embodiments of the present invention.

Figure 1:
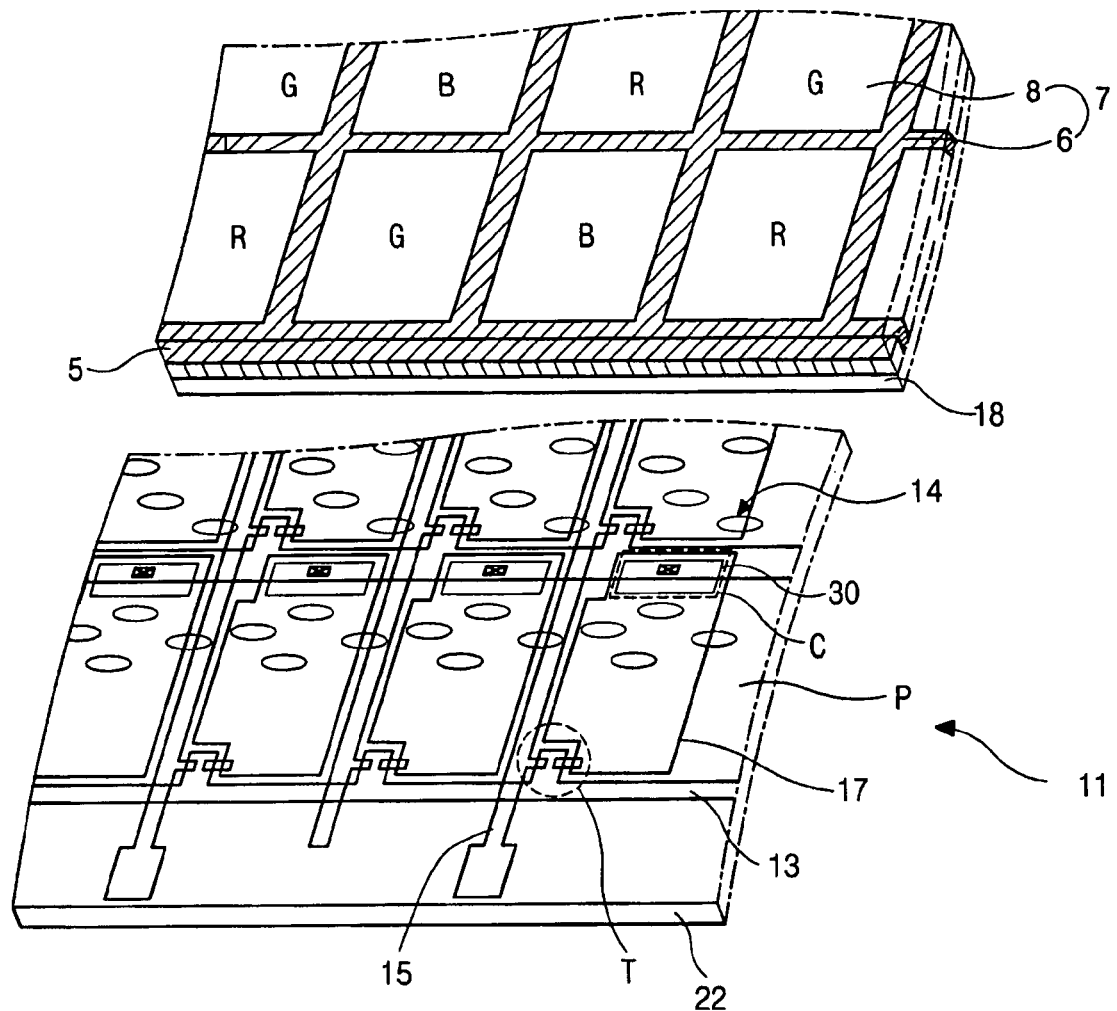
FIG. 1 is an exploded perspective view of a related art liquid crystal display (LCD) device.
Figure 2:
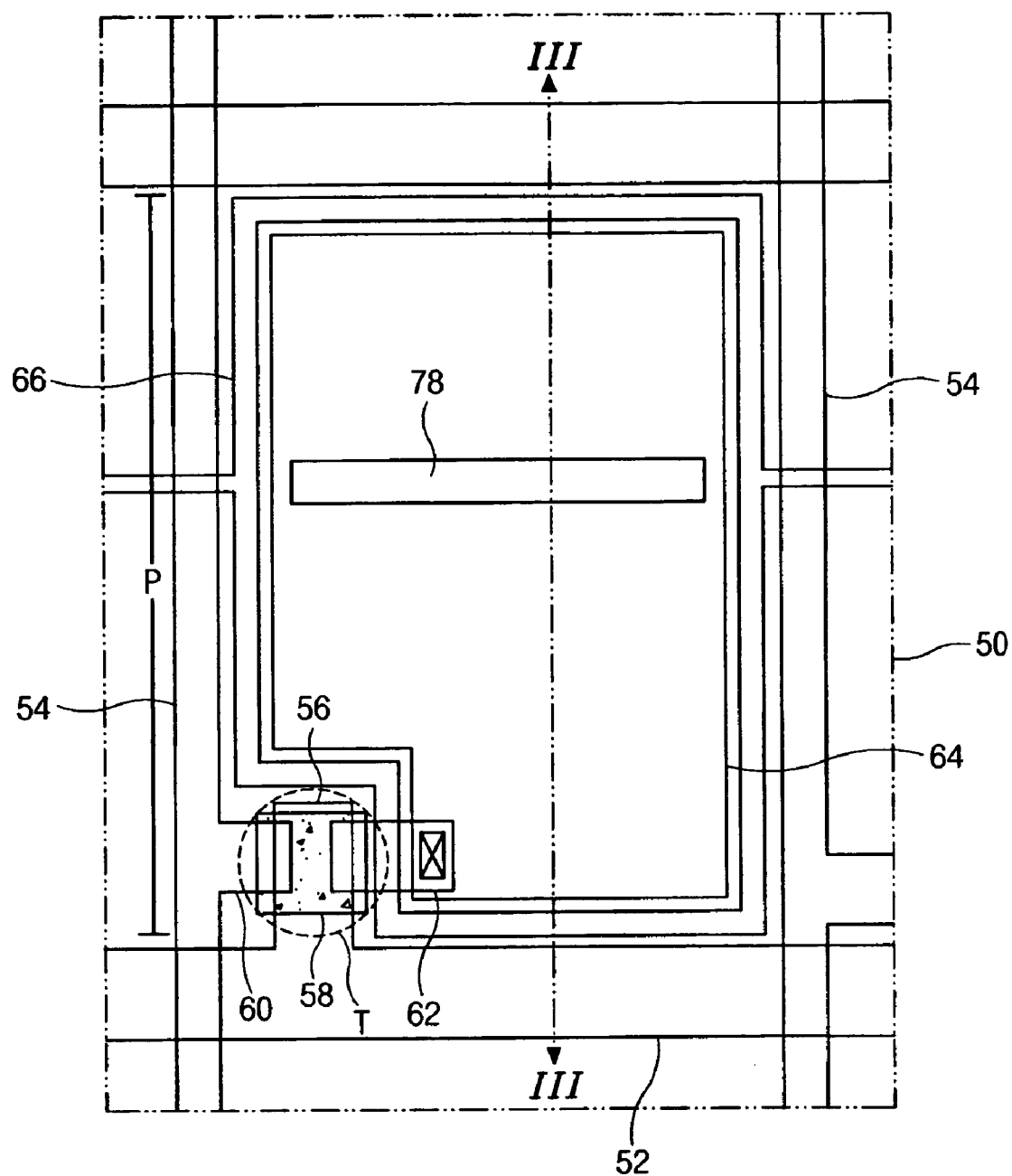
FIG. 2 is a plan view of a related art liquid crystal display (LCD) device having a multi-domain structure.
Figure 3:
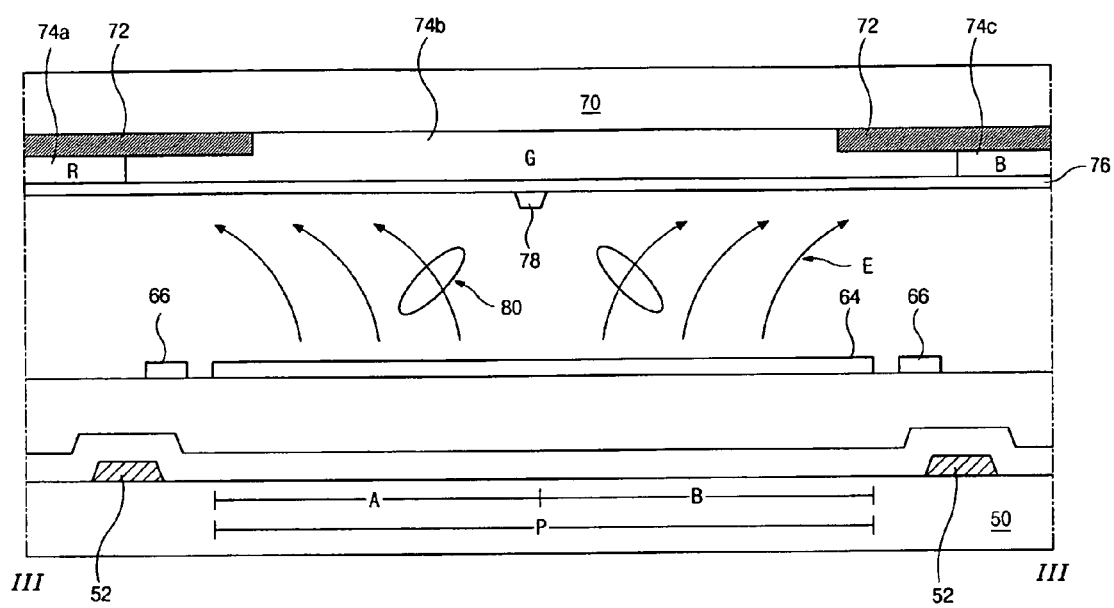
FIG. 3 is a cross-sectional view taken along a line "III—III" in FIG. 2.
Figure 4:
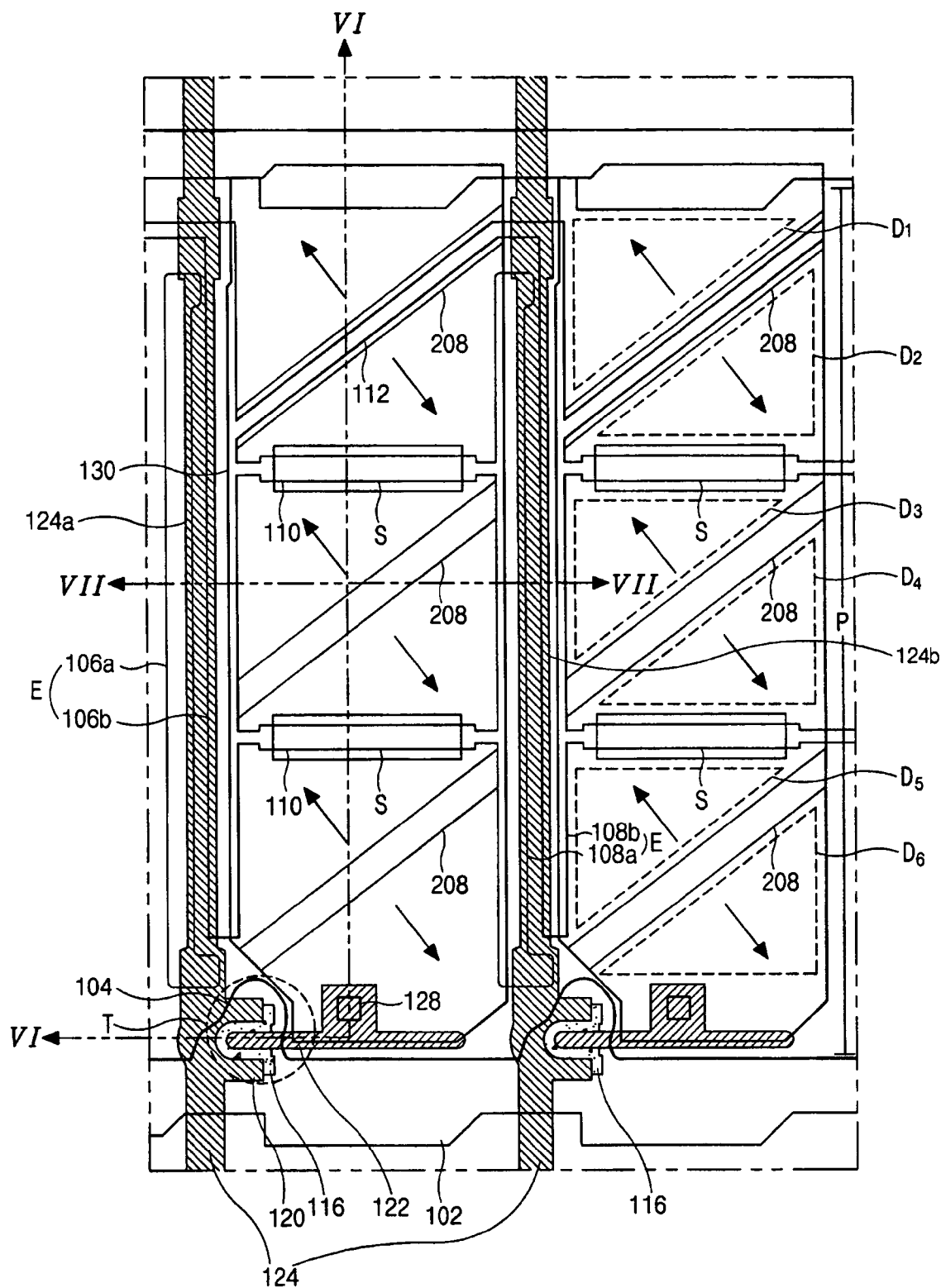
FIG. 4 is a plan view of an array substrate for a liquid crystal display (LCD) device having a multi-domain structure according to the present invention.

FIG. 4 is a plan view of an array substrate for a liquid crystal display (LCD) device having a multi-domain structure according to the present invention. In FIG. 4, a gate line 102 is formed in a first direction and a data line 124 is formed in a second direction perpendicular to the first direction. The gate and data lines 102 and 124 define a pixel region "P" by crossing each other. A thin film transistor "T" having a gate electrode 104 connected to the gate line 102, an active layer 116, a source electrode 120 connected to the data line 124 and a drain electrode 122 is formed near a crossing point of the gate and data lines 102 and 124. A pixel electrode 130 connected to the drain electrode 122 is formed in the pixel region "P". An auxiliary electrode "E" formed around the pixel electrode 130 has first, second, third and fourth vertical electrodes 106a, 106b, 108a and 108b and a horizontal electrode 110. The first and second vertical electrodes 106a and 106b are formed under a first data line 124a and the third and fourth vertical electrodes 108a and 108b are formed under a second data line 124b, i.e., a data line next to the first data line 124a. The horizontal electrode 110 connects the second vertical electrode 106b to the third vertical electrode 108a. The second vertical electrode 106b under the first data line 124a is connected to the fourth vertical electrode 108b under the second data line 124b via a connecting electrode 112. Because the second and fourth vertical electrodes 106b and 108b are connected to each other via the connecting electrode 112, all components of the auxiliary electrode "E" such as the first, second, third and fourth vertical electrodes and the horizontal electrodes 110 can receive a same signal. At least two horizontal electrodes 110 are formed in a pixel region "P". Protrusions 208 are formed on the upper substrate (not shown) in space corresponding to diagonal regions in the pixel region "P" and slits "S" are formed through the pixel electrode 130 in space corresponding to the horizontal electrodes 110. The first and third vertical electrodes 106a and 108a under the data line 124 can be used as a repair line when the data line is broken.

Figure 5:
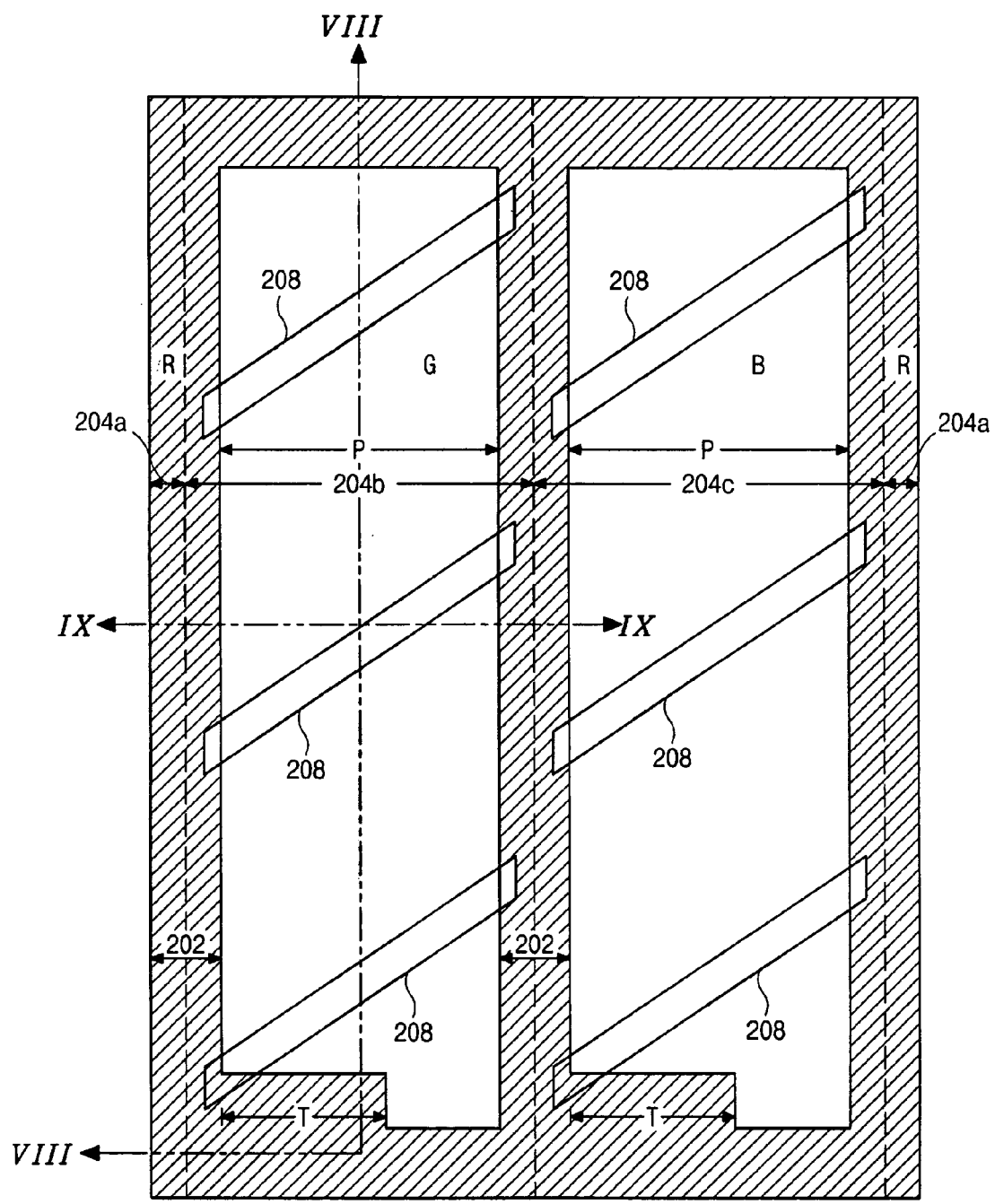
FIG. 5 is a plan view of a color filter substrate for a liquid crystal display (LCD) device having a multi-domain structure according to the present invention.

FIG. 5 is a plan view of a color filter substrate for a liquid crystal display (LCD) device having a multi-domain structure according to the present invention. In FIG. 5, a black matrix 202 is formed on the upper substrate in space corresponding to the gate line 102 in FIG. 4, the data line 124 in FIG. 4 and the thin film transistor "T" and sub-color filters 204a, 204b and 204c are formed on the upper substrate in space corresponding to the pixel region "P". As mentioned before, protrusions 208, i.e., the projected pattern, are formed at the diagonal region in the pixel region "P". As shown in FIG. 4 and FIG. 5, the auxiliary electrode "E" including the first, second, third and fourth vertical electrodes 106a, 106b, 108a and 108b and the horizontal electrodes 110, the protrusions 208 and the slits "S" generate a multi-domain structure including a first domain D1, a second domain D2, a third domain D3, a fourth domain D4, a fifth domain D5 and a sixth domain D6 in a pixel region "P" so that a wide viewing angle can be provided. In the liquid crystal display (LCD) device having the aforementioned structure, a fringe field is formed symmetrically about the protrusions 208 and the slits "S" and the auxiliary electrode "E" serves to increase the fringe field. Accordingly, the pixel region "P" can be divided into many domains including the first domain D1, the second domain D2, the third domain D3, the fourth domain D4, the fifth domain D5 and the sixth domain D6 so that liquid crystal molecules in each domain have a symmetric alignment with respect to the protrusions 208 and the slits "S". The first and sixth domains D1 and D6 induce the fringe field by utilizing signals of the gate line 102 and the fourth vertical electrode 108b adjacent thereto at the same time.

Figure 6A:
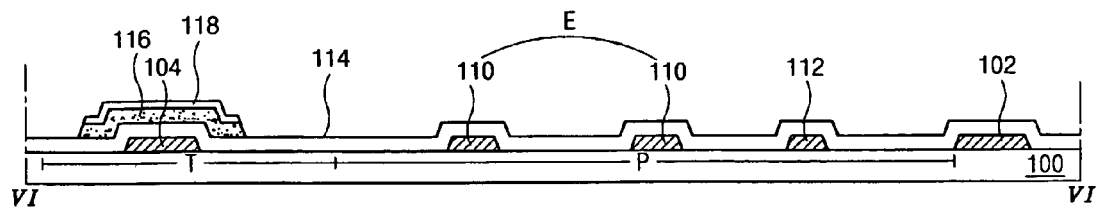
FIGS. 6A to 6C are cross-sectional views taken along a line "VI—VI" in FIG. 4 and illustrating a fabrication method of an array substrate according to the present invention.
Figure 6B:
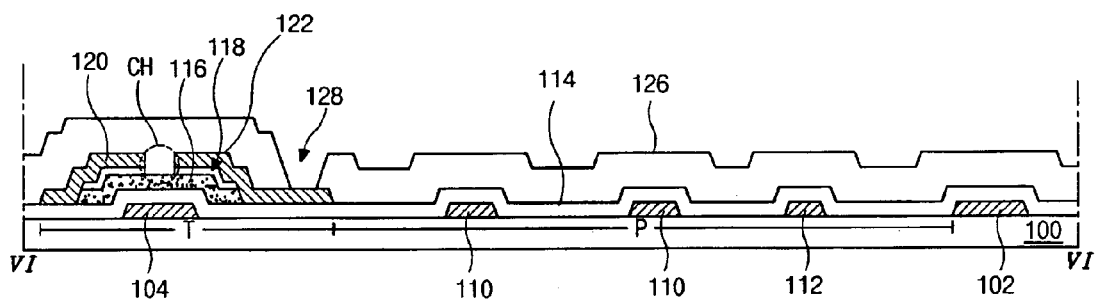
Figure 6C:
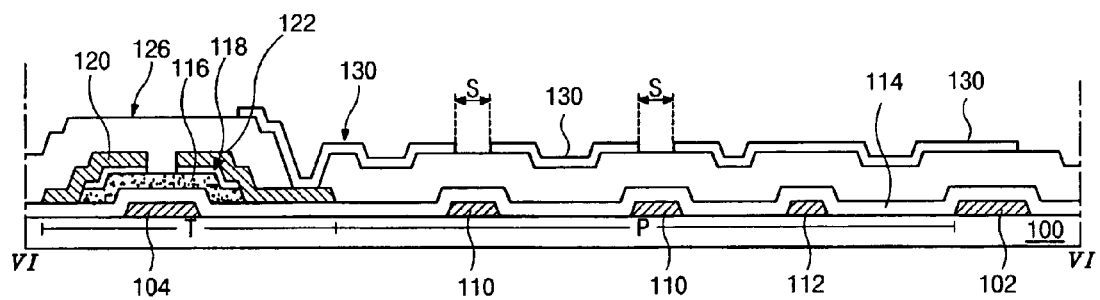
Figure 7A:
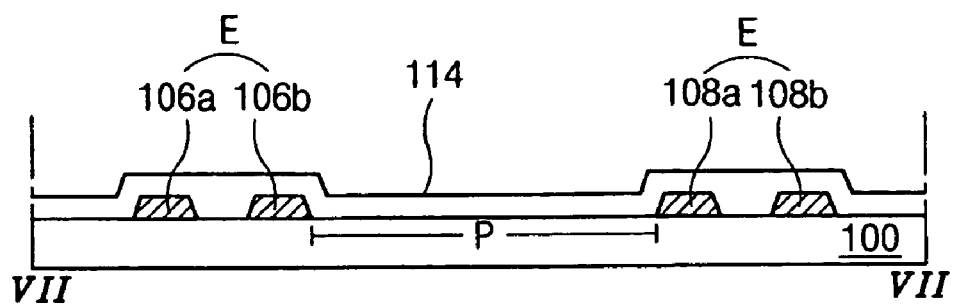
FIGS. 7A to 7C are cross-sectional views taken along a line "VII—VII" in FIG. 4 and illustrating a fabrication method of an array substrate according to the present invention.
Figure 7B:
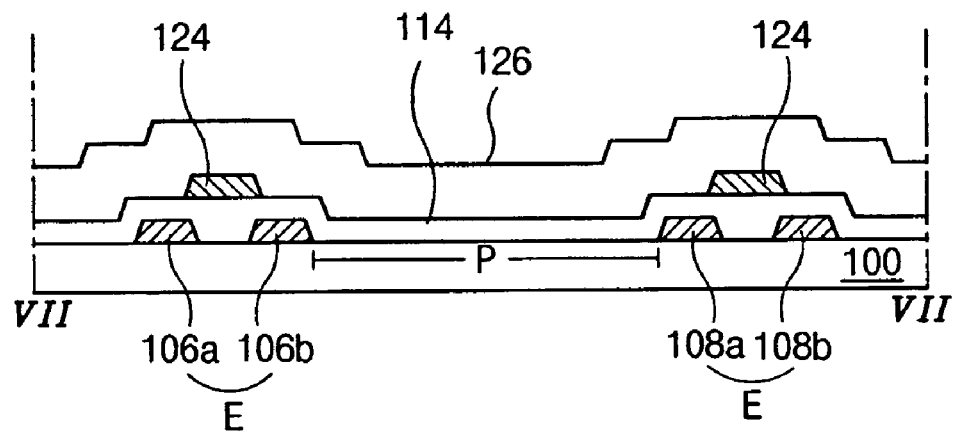
Figure 7C:
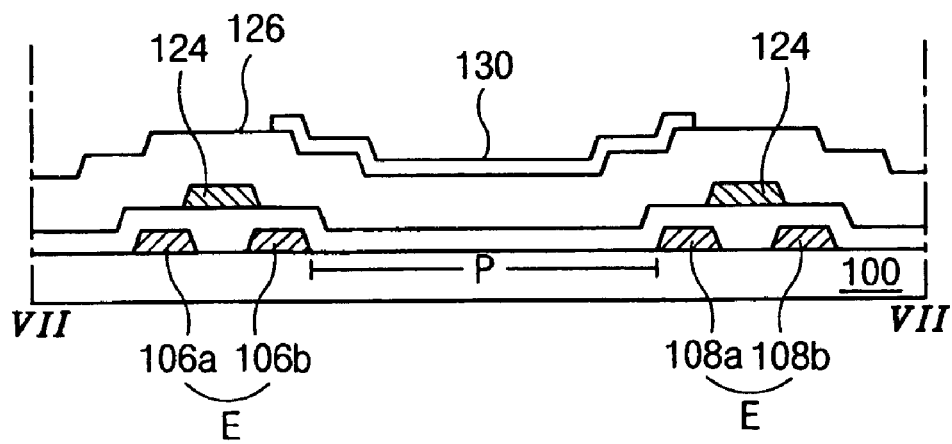

FIGS. 6A to 6C are cross-sectional views taken along a line "VI—VI" in FIG. 4 and illustrating a fabrication method of an array substrate according to the present invention and FIGS. 7A to 7C are cross-sectional views taken along a line "VII—VII" in FIG. 4 and illustrating a fabrication method of an array substrate according to the present invention. In FIG. 6A and FIG. 7A, a pixel region "P" and a thin film transistor region "T" are defined on a substrate 100. A gate line 102 and a gate electrode 104 connected to the gate line 102 are formed on the substrate 100 by depositing conductive metal material such as aluminum (Al), aluminum alloys, chromium (Cr), molybdenum (Mo), tungsten (W), copper (Cu) and then patterning the deposited conductive metal material. At this time, an auxiliary electrode "E" having a plurality of horizontal electrodes 110, first, second, third and fourth vertical electrodes 106a, 106b, 108a and 108b, and a connecting electrode 112 is also formed around the pixel region "P". The horizontal electrodes 110 are formed in horizontal direction with the gate line 102. The first and second vertical electrodes 106a and 106b are formed at one of lateral sides of the pixel region "P" under a data line that will be formed later and the third and fourth vertical electrodes 108a and 108b are formed at the other lateral side of the pixel region "P" under another data line that will be formed later. The second vertical electrode 106b is connected to the fourth vertical electrode 108 via the connecting electrode formed in one of diagonal regions in the pixel region "P". The number of the horizontal electrodes 110 may be changed depending on a situation and the horizontal electrodes 110 are spaced apart from each other in the pixel region "P". A gate insulating layer 114, i.e., a first insulating layer, is formed by depositing one of inorganic insulating materials such as silicon nitride (SiNx) and silicon oxide (SiO$_2$) on the whole substrate 100 on which the gate line 102, the gate electrode 104 and the auxiliary electrode "E" are already formed. An active layer 116 and an ohmic contact layer 118 are formed on the gate insulating layer 114 in a space corresponding to the gate electrode 104 by sequentially depositing amorphous silicon (a-Si:H) and impurity-doped amorphous silicon (n$^+$a-Si:H) on the gate insulating layer 114 and then patterning the deposited amorphous silicon (a-Si:H) and the impurity-doped amorphous silicon (n$^+$a-Si:H). In FIG. 6B and FIG. 7B, a source electrode 120 and a drain electrode 122 spaced apart from the source electrode 120 are formed on the ohmic contact layer 118 by depositing one of conductive metal material such as aluminum (Al), aluminum alloys, chromium (Cr), molybdenum (Mo), tungsten (W), copper (Cu) on the whole substrate 100 on which the active layer 116 and the ohmic contact layer 118 are already formed and then patterning the deposited conductive metal material. A data line 124 connected to the source electrode 120 is also formed at this time in a direction perpendicular to the gate line 102. The data line 124 formed over the first, second, third and fourth vertical electrodes 106a, 106b, 108a and 108b. The source electrode 120 has a shape of "U" and the drain electrode 122 is spaced apart from the source electrode 120 as shown in FIG. 4. Accordingly, because an active channel "CH" between the source and drain electrodes 120 and 122 can be formed in "U" shape, a ratio of a width to a length of the active channel "CH" can be increased. A passivation layer 126 is formed on the whole substrate 100 on which the source and drain electrodes 120 and 122 are already formed by depositing one of inorganic insulating materials such as silicon nitride (SiNx) and silicon oxide (SiO$_2$) or organic insulating material such as benzocyclobutene (BCB) and acrylic resin on the substrate 100. A drain contact hole 128 exposing a portion of the drain electrode 122 is formed through the passivation layer 126 by patterning the passivation layer 126. In FIG. 6C and FIG. 7C, a pixel electrode 130 connected to the drain electrode 122 via the drain contact hole 128 is formed in the pixel region "P" by depositing one of transparent conductive metal material including indium tin oxide (ITO) or indium zinc oxide (IZO) on the substrate 100 and then patterning the deposited transparent conductive metal material. Slits "S" are formed by removing portions of the pixel electrode 130 corresponding to the horizontal electrode 110.

Figure 8A:
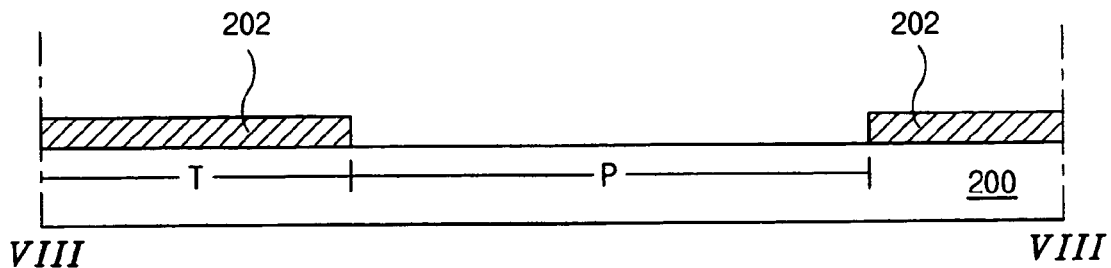
FIGS. 8A to 8C are cross-sectional views taken along a line "VIII—VIII" in FIG. 5 and illustrating a fabrication method of a color filter substrate according to the present invention.
Figure 8B:
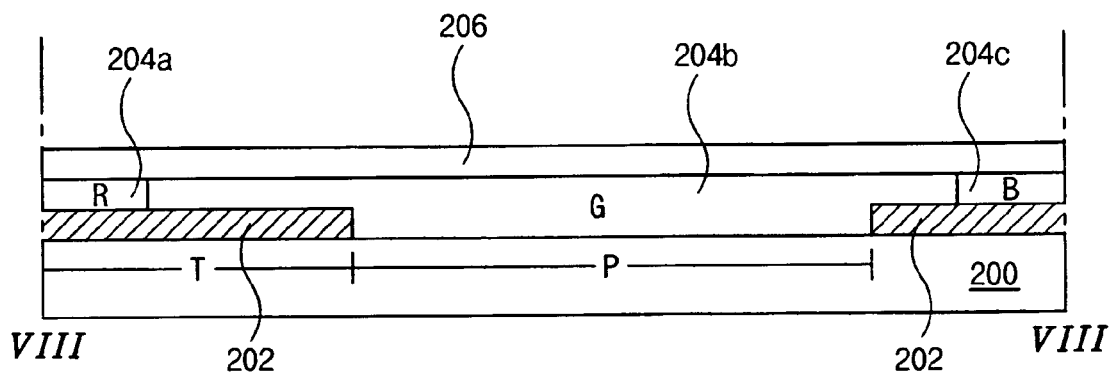
Figure 8C:
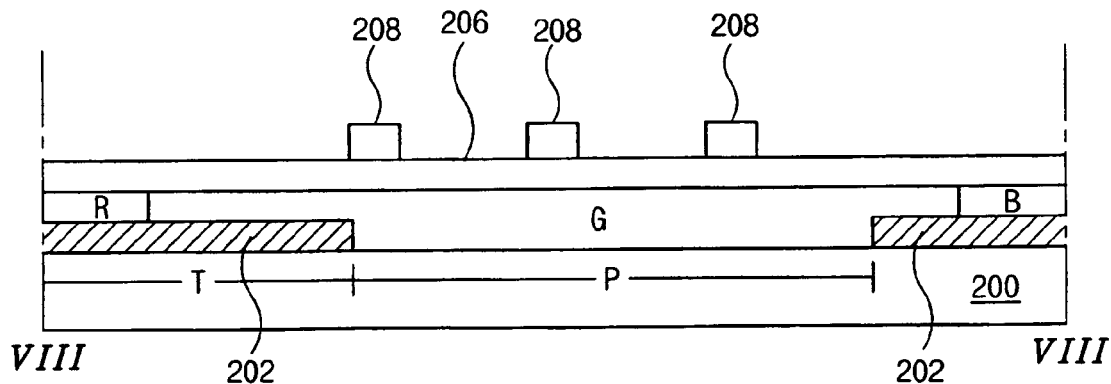
Figure 9A:
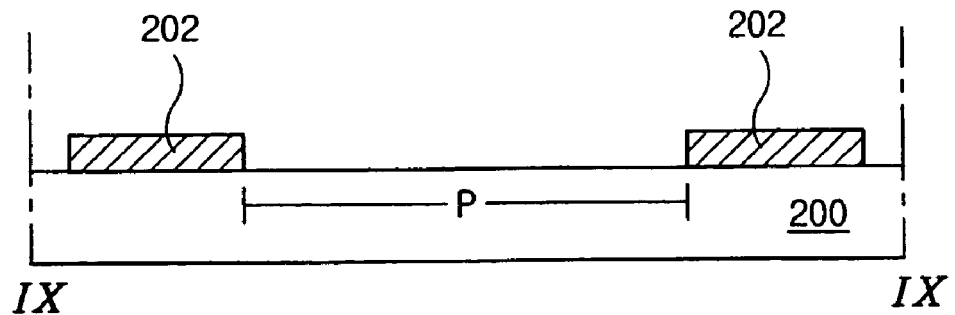
FIGS. 9A to 9C are cross-sectional views taken along a line "IX—IX" in FIG. 5 and illustrating a fabrication method of a color filter substrate according to the present invention.
Figure 9B:
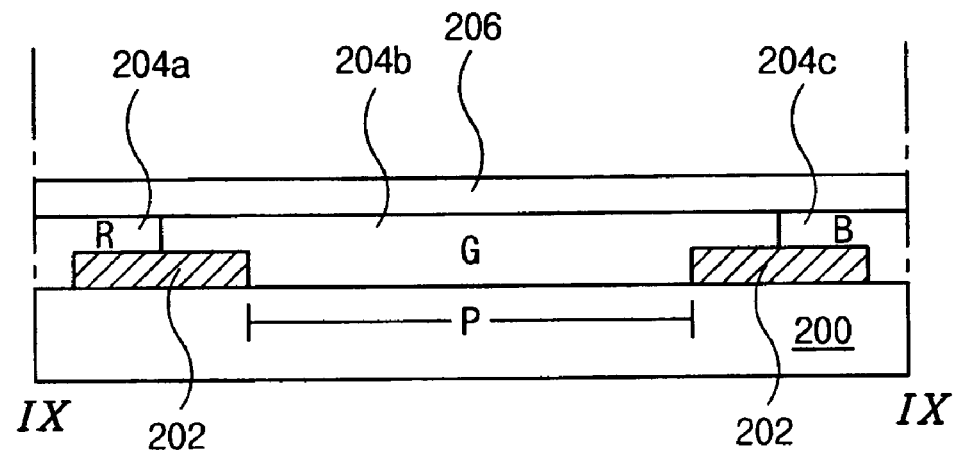
Figure 9C:
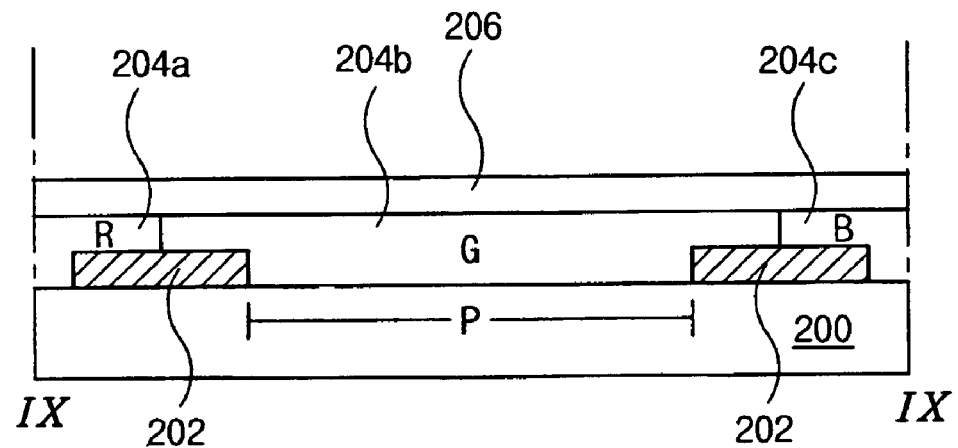

FIGS. 8A to 8C are cross-sectional views taken along a line "VIII—VIII" in FIG. 5 and illustrating a fabrication method of a color filter substrate according to the present invention and FIGS. 9A to 9C are cross-sectional views taken along a line "IX—IX" in FIG. 5 and illustrating a fabrication method of a color filter substrate according to the present invention. In FIG. 8A and FIG. 9A, a pixel region "P" and a thin film transistor region "T" are defined on a substrate 200. A black matrix 202 is formed on the substrate 200 in a space corresponding to the gate line 102 in FIG. 6C, the data line 124 in FIG. 6C and the thin film transistor "T" in FIG. 6C by depositing material having a low reflexibility such as material including chromium (Cr) or chromium (Cr)/chromium oxide (CrO$_x$) on the substrate 200 and then pattering the deposited material. In FIG. 8B and FIG. 9B, sub-color filters 204a, 204b and 204c are formed on the substrate 200 by coating a color resin on the whole substrate 200 on which the black matrix 202 is already formed and then pattering the coated color resin. A common electrode 206 is formed by depositing one of transparent conductive metal material such as indium tin oxide (ITO) and indium zinc oxide (IZO) on the whole substrate 200 on which the sub-color filters 204a, 204b and 204c are already formed and then pattering the deposited transparent conductive metal material. In FIG. 8C and FIG. 9C, a protrusion 208, i.e., a projected pattern, is formed on the common electrode 206 in a space corresponding to the diagonal region of the array substrate 100 by depositing one of organic insulating material and photosensitive organic insulating material and then pattering the deposited organic insulating material. The liquid crystal display (LCD) device having a wide viewing angle property according to the present invention can be manufactured by attaching the upper and array substrate 200 and 100. As aforementioned, the auxiliary electrode "E" of the present invention can also serve as a repair line in case the data line 124 is broken. A method for repairing the broken data line will be described hereinafter with reference to FIG. 10.

Figure 10:
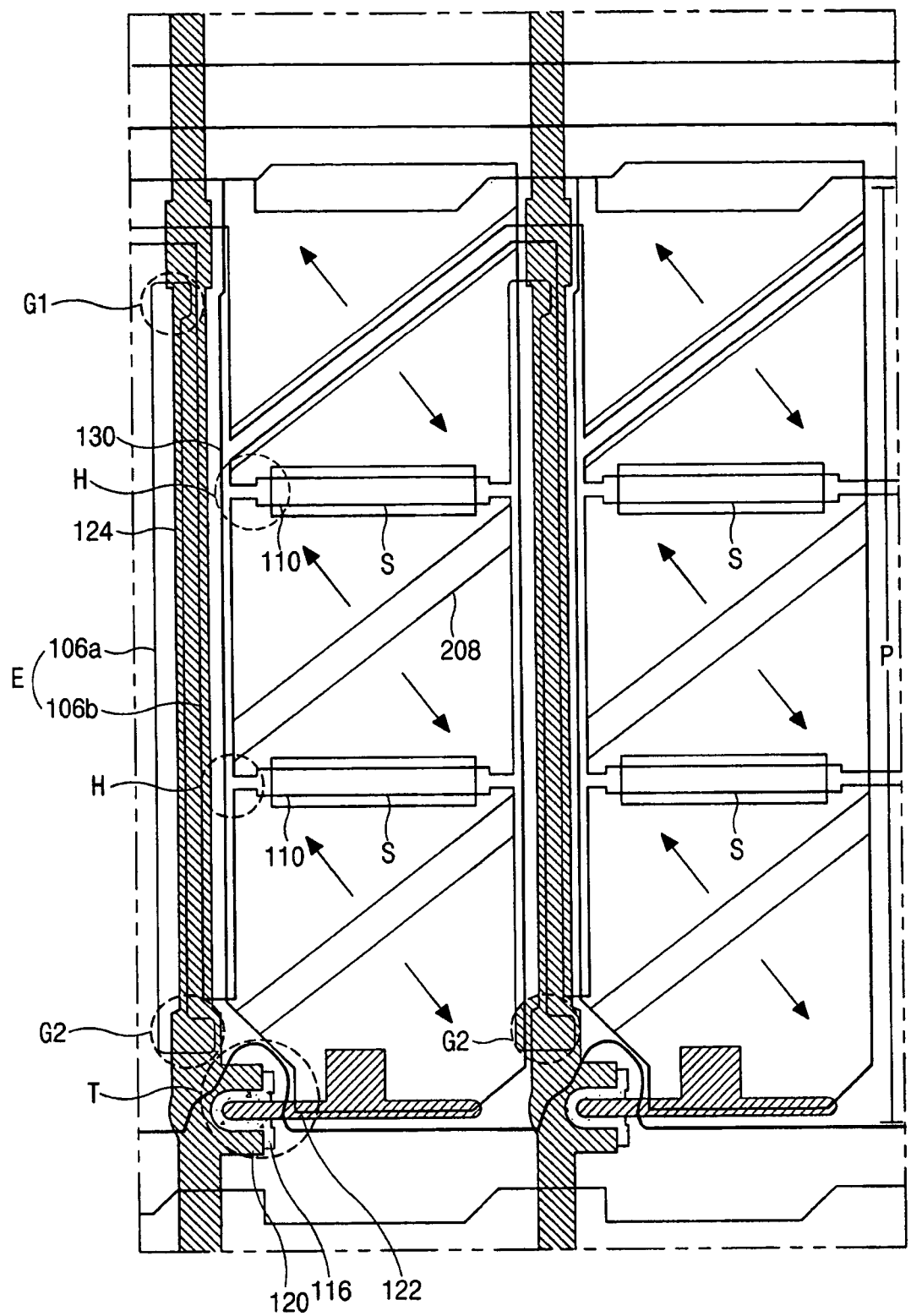
FIG. 10 is a schematic plan view of an array substrate for a liquid crystal display (LCD) device having an auxiliary electrode under a data line according to the present invention.

FIG. 10 is a schematic plan view of an array substrate for a liquid crystal display (LCD) device having the auxiliary electrode under the data line according to the present invention. Assuming the data line 124 is broken, both ends "G1" and "G2" of the first vertical electrode 106a are connected to the broken data line 124 by a certain method such as a laser-welding and then a connection portion "H" between the second vertical electrode 106 and the horizontal electrode 110 is cut. Accordingly, the first vertical electrode 106a is electrically severed from the horizontal electrode 110 and thus serves to deliver a data signal instead of the broken data line 124. By the aforementioned method, the first vertical electrode 106 can be used as the repair line for the broken data line.

Figure 11:
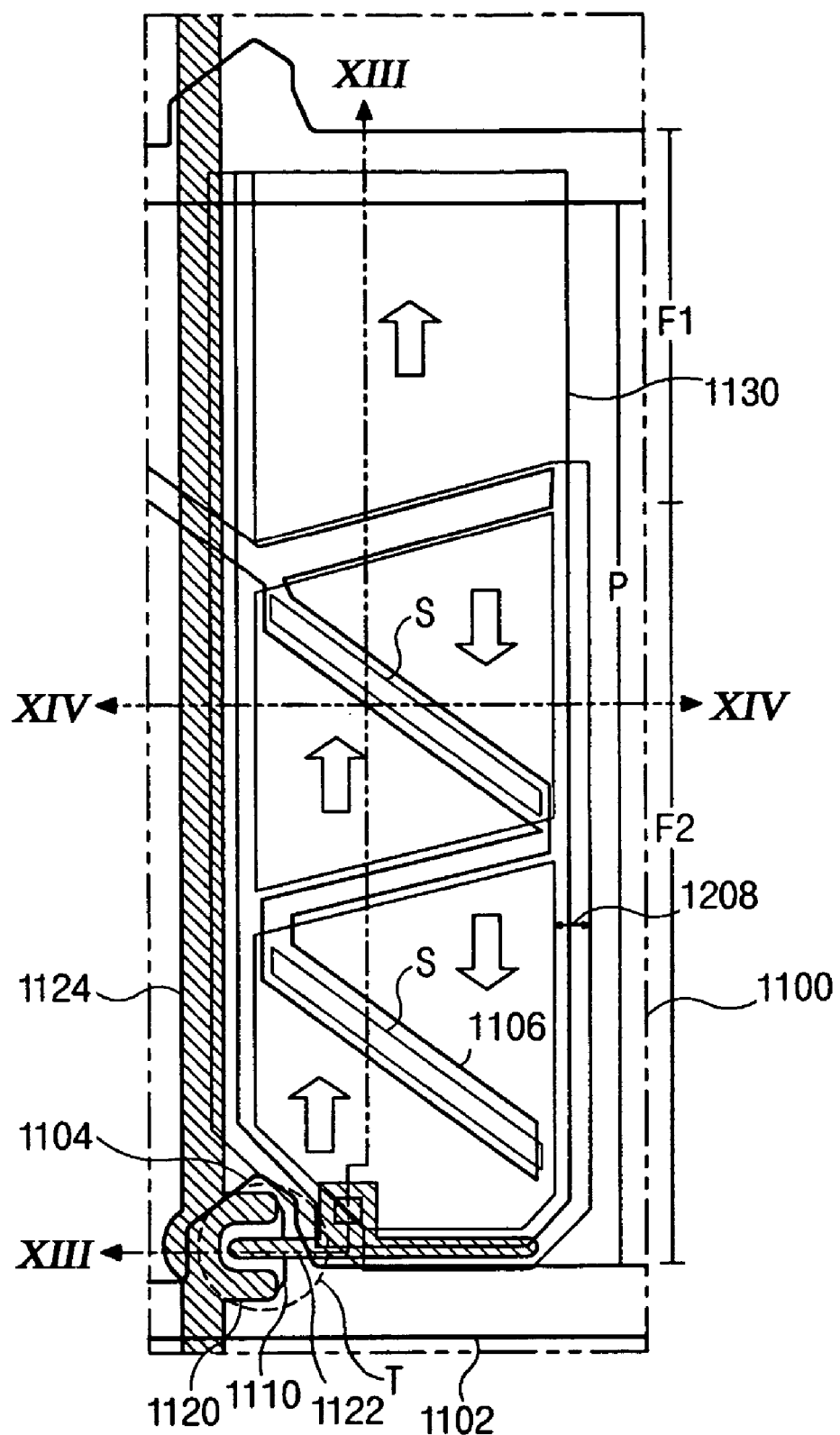
FIG. 11 is a plan view of an array substrate for a liquid crystal display (LCD) device having a multi-domain structure according to another embodiment of the present invention.
Figure 12:
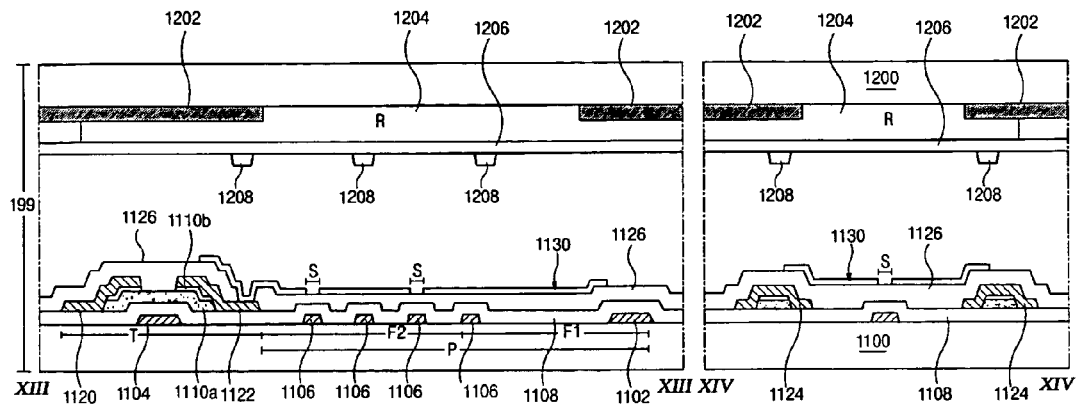
FIG. 12 is a cross-sectional views taken along lines "XIII—XIII" and "XIV—XIV" in FIG. 11.

FIG. 11 is a plan view of an array substrate for a liquid crystal display (LCD) device having a multi-domain structure according to another embodiment of the present invention. In FIG. 11, a protrusion 1208 formed on an upper substrate is also illustrated for the sake of explanation. In FIG. 11, a gate line 1102 is formed on a substrate 1100 in a first direction and a data line 1124 defining a pixel region "P" by crossing the gate line 1102 is formed on the substrate 1100 in a second direction perpendicular to the first direction. A thin film transistor "T" having a gate electrode 1104 extended from the gate line 1102, a semiconductor layer 1110 over the gate electrode 1104, a source electrode 1120 on semiconductor layer 1110 and a drain electrode 1122 spaced apart from the source electrode 1120 is formed at a crossing portion of the gate and data lines 1102 and 1124. Because the source electrode 1120 has a shape of "U" and the drain electrode 1122 is spaced apart from the source electrode 1120 as shown in FIG. 11, an exposed semiconductor layer 1110 between the source and drain electrodes 1120 and 1122 has also a shape of "U". The "U" shape of the semiconductor layer 1110 increases a ratio of width to length of the semiconductor layer 1110 and thus increases a mobility of carriers. Accordingly, a performance of the thin film transistor "T" can be improved. A pixel electrode 1130 connected to the drain electrode 1122 is formed in the pixel region "P". The pixel region "P" is divided into first and second region "F1" and "F2". Only the second region "F2" is divided into a plurality of domains and the first region "F" is used as in a typical TN (twisted nematic) mode. An auxiliary electrode 1106 is formed in the second region "F2" in a zigzag pattern and slits "S" are formed in the pixel electrode at a space corresponding to selected diagonal portions of the auxiliary electrode 1106. The protrusion 1208 is formed on the upper substrate (not shown) at a position corresponding to portions of the auxiliary electrode 1106 that do not correspond to the slits "S". The protrusion 1208 is formed around the second region "F2" of the pixel region "P" and is extended along the data line 1124. With the aforementioned structure of the array substrate 1100, the pixel region "P" can be divided into multi-domains in which an electric field in each domain is symmetric to the electric field in an adjacent domain. The reason to form the protrusion 1208 around the second region "F2" is to stabilize an electric field direction in the pixel region "P". Because a portion of the pixel region is divided into multi-domains according to the present invention, an aperture ratio can be increased by reducing the numbers of the auxiliary electrodes and the slits that are a main factor in reducing the aperture ratio of the liquid crystal display (LCD) device. Though the pixel region "P" includes a plurality of asymmetrical domains having different areas, the different areas of the divided domains does not affect the viewing angle property and a gray level property of the liquid crystal display (LCD) device. Though not shown in FIG. 11, the pixel electrode 1130 and the auxiliary electrode 1106 under the pixel electrode 1130 form a storage capacitor FIG. 12 is a cross-sectional view taken along lines "XIII—XIII" and "XIV—XIV" in FIG. 11. In FIG. 12, a liquid crystal display (LCD) device 199 has a first substrate 1100 and second substrate 1200 opposing the first substrate 1100 and a pixel region "P" having the first and second regions "F1" and "F2" is formed on the first substrate 1100. A thin film transistor having the gate electrode 1104, active layer 1110a, an ohmic contact layer 1110b, the source electrode 1120 and the drain electrode 1122 is formed on the first substrate 1100. The auxiliary electrode 1106 having the zigzag pattern is formed in the second region "F2" of the pixel region "P". The gate line 1102 connected to the gate electrode 1104 and providing a signal to the gate electrode 1104 and the auxiliary electrode 1106 are formed on a same layer with the same material. A gate insulating layer 1108 is formed on the whole substrate 1100 on which the gate electrode 1104 and the auxiliary electrode 1106 are already formed. The data line 1124 defining the pixel region "P" by crossing the gate line 1102 is formed on the gate insulating layer 1108 at both sides of the pixel region "P". A passivation layer 1126 is formed on the substrate 1100 by coating one of organic insulating material such as benzocyclobutene (BCB) and acrylic resin on the whole substrate 1100 on which the thin film transistor and the data line 1124 are already formed. Though the passivation layer 1126 is not formed flat in FIG. 12, the surface state of the passivation layer 1126 is usually flat when the passivation layer 1126 is formed of the organic insulating layer. A transparent pixel electrode 1130 is formed on the passivation layer 1126 at a position corresponding to the pixel region "P". The pixel electrode 1130 is connected to the drain electrode 1122 and has a plurality of slits "S" corresponding to portions of the auxiliary electrode 1106. That is, the slits "S" are formed at positions of the pixel electrode 1130 corresponding to portions of the auxiliary electrode 1106 having a same diagonal direction as shown in FIG. 11. The slits "S" are formed only in the second region "F2" of the pixel region "P". A black matrix 1202 is formed on the second substrate 1200 at a position corresponding to the thin film transistor, the gate line 1102 and the data line 1124. A color filter 1204 is formed on the second substrate 1200 at a position corresponding to the pixel region "P". A transparent common electrode 1206 for forming an electric field with the pixel electrode 1130 is formed on the color filter 1204. The protrusion 1208 is formed on the common electrode 1206 at positions corresponding to portions of the auxiliary electrode 1106 that do not correspond to the slits "S". The protrusion 1208 is further formed around the second region "F2" and along the data line 1124. The protrusion 1208 is formed of organic insulating material. The slits "S", the protrusion 1208 and the auxiliary electrode 1106 form a plurality of domains having a different electric field in the second region "F2" and an electric field in each domain is symmetric to an electric field in an adjacent domain with respect to the auxiliary electrode 1106 and the slits "S". In the present invention, the slits "S", the auxiliary electrode 1106 and the protrusion 1208 for dividing the pixel region "P" into multi domains are formed only in the second region "F2" and are not formed in the first region "F1" of the pixel region "P". A fabrication method of the array substrate 1100 according to the present invention will be described more in detail hereafter with reference to FIGS. 13A and 13C and FIGS. 14A and 14C.

Figure 13A:
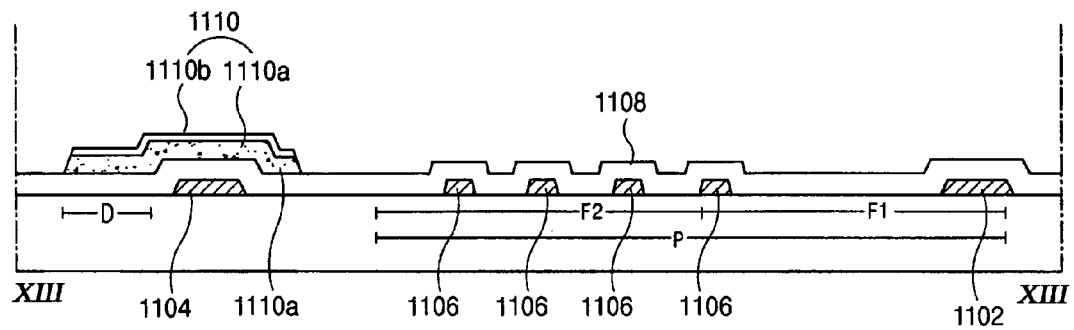
FIGS. 13A to 13C are cross-sectional views taken along a line "XIII—XIII" in FIG. 11 and illustrating a fabrication method of an array substrate according to the present invention.
Figure 13B:
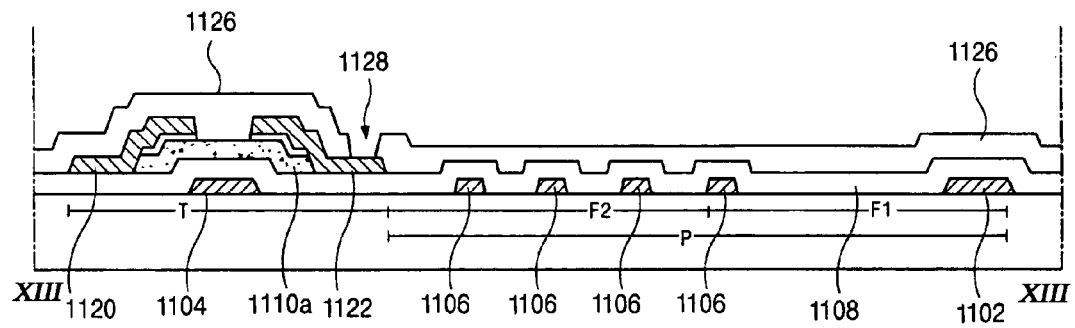
Figure 13C:
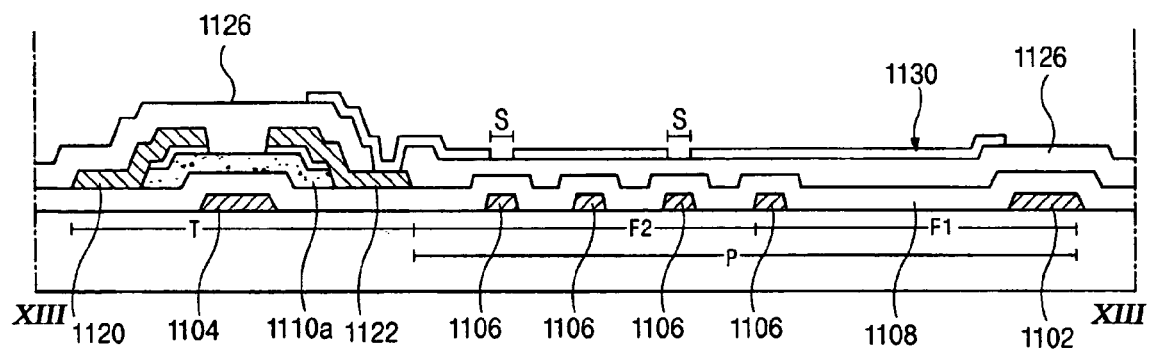
Figure 14A:
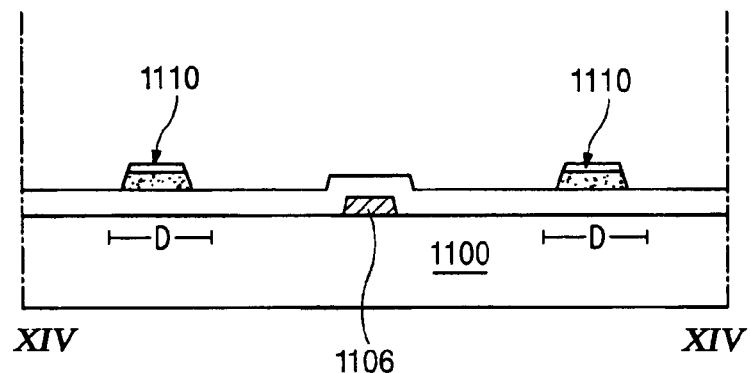
FIGS. 14A to 14C are cross-sectional views taken along a line "XIV—XIV" in FIG. 11 and illustrating a fabrication method of an array substrate according to the present invention.
Figure 14B:
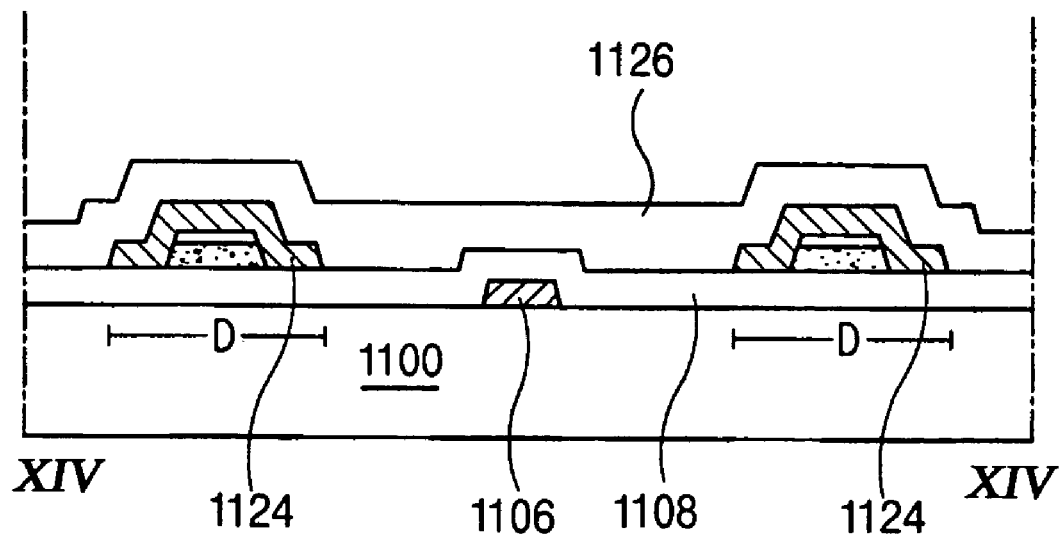
Figure 14C:
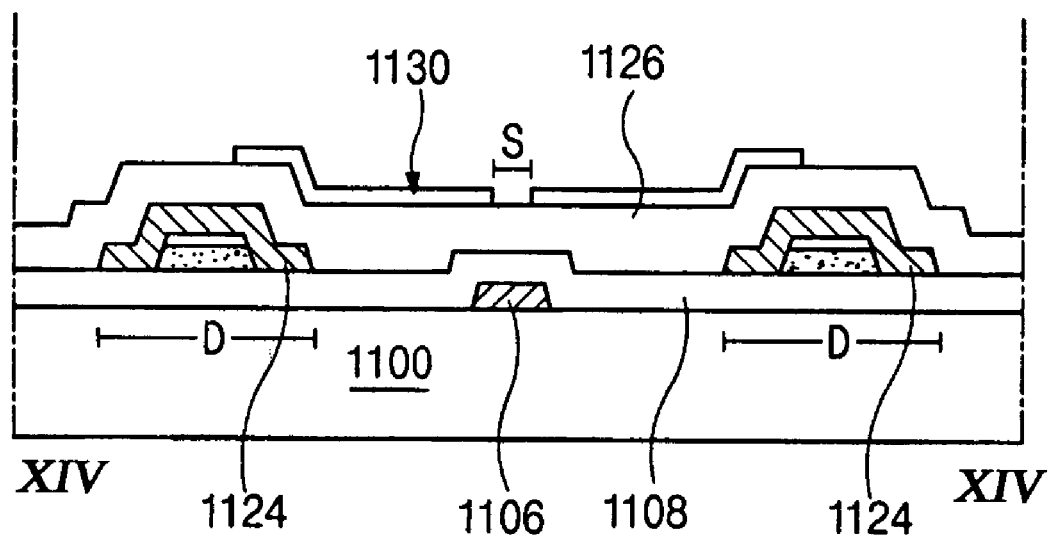

FIGS. 13A to 13C are cross-sectional views taken along a line "XIII—XIII" in FIG. 11 and illustrating a fabrication method of an array substrate according to the present invention and FIGS. 14A to 14C are cross-sectional views taken along a line "XIV—XIV" in FIG. 11 and illustrating a fabrication method of an array substrate according to the present invention. In FIG. 13A and FIG. 14A, a pixel region "P" having first and second regions "F1" and "F2" is defined on a substrate 1100. A gate line 1102 and a gate electrode 1104 connected to the gate line 1102 are formed on the substrate by depositing conductive material on the substrate 1100 and then patterning the deposited conductive material. At the same time, an auxiliary electrode 1106 having a zigzag pattern on the substrate 1100 in space corresponding to the second region "F2". Each diagonal portion of the auxiliary electrode 1106 is interconnected. A gate insulating layer 1108 is formed on the substrate 1100 by depositing one of inorganic insulating materials such as silicon nitride (SiNx) and silicon oxide (SiO$_2$) on the whole substrate 1100 on which the gate line 1102, the gate electrode 1104 and the auxiliary electrode 1106 are already formed. A semiconductor layer 1110 having an active layer 1110a and an ohmic contact layer 1110b is formed on the gate insulating layer 1108 at positions corresponding to the gate electrode 1104 and a data line 1124 that will be formed later by sequentially depositing amorphous silicon (a-Si:H) and impurity-doped amorphous silicon (n$^+$a-Si:H) and then pattering the deposited silicon material. In FIG. 13B and FIG. 14B, a source electrode 1120, a drain electrode 1122 spaced apart from the source electrode 1120 and the data line 1124 are formed on the substrate 1100 by depositing one of conductive metal material such as tungsten (W), chromium (Cr), molybdenum (Mo) and copper (Cu) on the whole substrate 1100 on which the semiconductor layer 1100 is already formed and then pattering the deposited conductive metal material. The source and drain electrodes 1120 and 1122 are formed on the ohmic contact layer 1110b and the source electrode 1120 is connected to the data line 1124. At the same time, the semiconductor layer 1110 is further disposed under the data line as mentioned in FIG. 13A and FIG. 14A. A passivation layer 1126 is formed on the substrate 1100 by coating one of organic insulating material such as benzocyclobutene (BCB) and acrylic resin on the whole substrate 1100 on which the source and drain electrodes 1120 and 1122 and the data line 1124 are already formed. A drain contact hole 1128 exposing a portion of the drain electrode 1122 is formed by pattering the passivation layer 126. In FIG. 13C and FIG. 14C, a pixel electrode 1130 is formed on the substrate 1100 by depositing one of transparent conductive metal material such as indium tin oxide (ITO) and indium zinc oxide (IZO) on the whole substrate 1100 on which the passivation layer 1126 is already formed and then patterning the deposited transparent conductive metal material. The pixel electrode 1130 is connected to the drain electrode 1122 via the drain contact hole 1128 and corresponds to the pixel region "P". Slits "S" are formed in the pixel electrode 1130 at positions corresponding to some portions of the auxiliary electrode 1106 under the pixel electrode 1130. That is, the slits "S" correspond to the portions of the auxiliary electrode 1106 having a same diagonal direction as shown in FIG. 11. As mentioned in FIG. 12, a protrusion 1208 in FIG. 12 is formed on the upper substrate 1200 in FIG. 12 at positions corresponding to portions of the auxiliary electrode 1106 that do not correspond to the slits "S".

Figure 15:
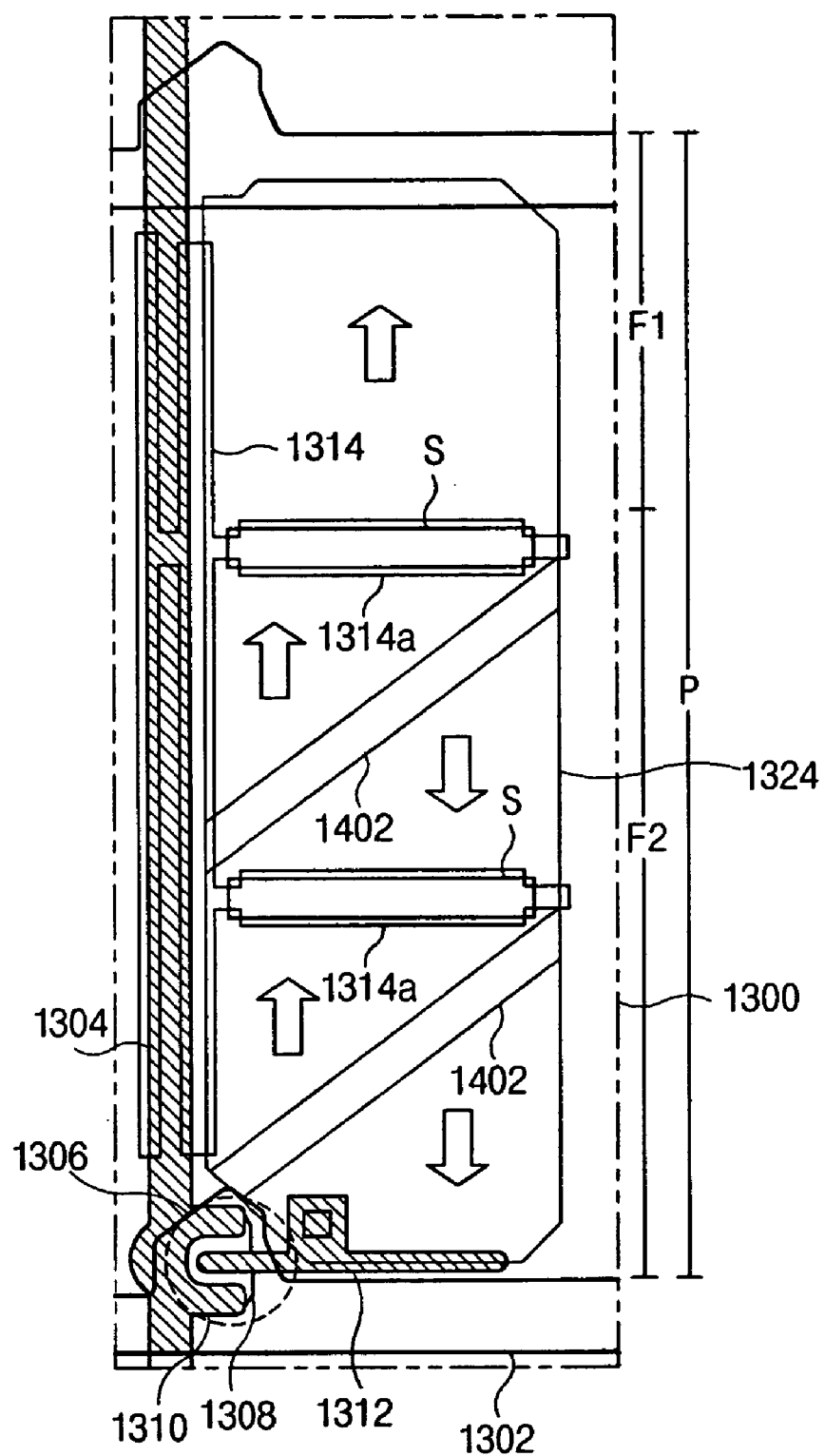
FIG. 15 is a plan view of an array substrate for a liquid crystal display (LCD) device having a multi-domain structure according to another embodiment of the present invention.

FIG. 15 is a plan view of an array substrate for a liquid crystal display (LCD) device having a multi-domain structure according to another embodiment of the present invention. In FIG. 15, a pixel region "P" having first and second regions "F1" and "F2" is defined on a substrate 1300. A gate line 1302 is formed on the substrate 1300 in a first direction and a data line 1304 is formed on the substrate 1300 in a second direction perpendicular to the first direction. The gate and data lines 1302 and 1304 define the pixel region "P" by crossing each other. A thin film transistor having a gate electrode 1306, a semiconductor layer 1308, a source electrode 1310 and a drain electrode 1312 is formed at a crossing portion of the gate and data lines 1302 and 1304. The source electrode 1310 has a shape of "U" and the drain electrode 1312 is spaced apart from the source electrode 1310. An auxiliary electrode 1314 having a plurality of horizontal electrodes 1314a and a vertical electrode 1314b is formed on the substrate 1300. The horizontal electrodes are formed in the second region "F2" and spaced apart from each other and the vertical electrode 1314b connecting the horizontal electrodes 1314a is formed under the data line 1304. A pixel electrode 1324 having slits at positions corresponding to the horizontal electrodes 1314a is formed in the pixel region "P" and connected to the drain electrode 1312. A protrusion 1402 is formed on an upper substrate (not shown) in space between the slits "S" in a diagonal direction. The second region "F2" can be divided into a plurality of domains owing to the slits "S" and the protrusion 1402. The gate line 1302 and the drain electrode 1312 extended to the pixel region "P" function as an auxiliary electrode for uppermost and lowermost domains, respectively.

In the liquid crystal display (LCD) device according the present invention, a pixel electrode is divided into first and second regions and then only the second region is divided into a plurality of domains owing to slits, protrusion and an auxiliary electrode. Accordingly, because the first region is not divided into a plurality of domains but functions as in a general TN (twisted nematic) mode liquid crystal display (LCD) device, an aperture ratio and a viewing angle can be greatly improved.

The liquid crystal display (LCD) device according to the present invention has advantages as follows. Firstly, the liquid crystal display (LCD) device of the present invention can acquire a wide viewing angle by forming the auxiliary electrode around the pixel electrode and thus forming a multi-domain in the pixel region. Secondly, because the auxiliary electrode can also be used as the repair line in case the data is broken, a production cost can be reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a first substrate having a plurality of pixel regions;
   a plurality of gate and data lines on the first substrate;
   a thin film transistor at a crossing portion of the gate and data lines;
   a first auxiliary electrode under the data line;
   a plurality of second auxiliary electrodes in a horizontal direction in the pixel region;
   a pixel electrode in the pixel region;
   a plurality of protrusions on a second substrate, the protrusions being formed between the second auxiliary electrodes; and
   a liquid crystal layer between the first and second substrates.

2. The device according to claim 1, further comprising a plurality of slits in the pixel electrode.

3. The device according to claim 2, wherein the slits correspond to the plurality of second auxiliary electrodes.

4. The device according to claim 2, wherein the liquid crystal layer has a symmetric alignment with respect to the protrusion and the slit.

5. The device according to claim 1, further comprising a connecting electrode connecting the first auxiliary electrode to another first auxiliary electrode under an adjacent data line.

6. The device according to claim 1, further comprising:
   a black matrix layer on the second substrate;
   a color filter layer on the black matrix layer; and
   a common electrode on the color filter layer.

7. The device according to claim 1, wherein the pixel region is divided into a plurality of domains depending on the number of second auxiliary electrodes and the protrusions.

8. The device according to claim 7, wherein the number of second auxiliary electrodes are at least two and the number of protrusions are at least three.

9. The device according to claim 8, wherein the pixel region has at least six domains.

10. The device according to claim 7, wherein the gate line induces a fringe field to form abnormal electric fields in the domains near the upper and lower ends of the pixel region.

11. The device according to claim 1, wherein the first auxiliary electrode becomes a repair line when the data line is broken.

12. The device according to claim 11, wherein a connection between the first auxiliary electrode under the broken data line and another first auxiliary electrode under an adjacent data line to the broken data line is cut off by cutting a portion of the second auxiliary electrode.

13. The device according to claim 1, wherein the first and second auxiliary electrodes are of the same materials as the gate line.

14. The device according to claim 1, wherein the first and second auxiliary electrodes are formed from one of a conductive metal material from the group consisting of aluminum (Al), aluminum alloys, chromium (Cr), molybdenum (Mo), tungsten (W) and copper (Cu).

15. The device according to claim 1, wherein the protrusion is includes one of an organic insulating material and a photosensitive organic insulating material.

16. A method for manufacturing a liquid crystal display device, comprising:
   forming a plurality of gate lines on a first substrate in a first direction, the first substrate having a plurality of pixel regions;
   forming a plurality of data lines on the first substrate in a second direction;
   forming a thin film transistor having a gate electrode, an active layer, a source electrode and a drain electrode near a crossing portion of the gate and data lines;
   forming a first auxiliary electrode and a plurality of second auxiliary electrodes on the first substrate, the first auxiliary electrode having first and second portions spaced apart from each other under the data line, the second auxiliary electrode connecting the second portion of the first auxiliary electrode to a first portion of another first auxiliary electrode under an adjacent data line;
   forming a plurality of protrusions on a second substrate, the protrusions being formed between the second auxiliary electrodes; and
   forming a liquid crystal layer between the first and second substrates.

17. The method according to claim 16, further comprising forming a plurality of slits in the pixel electrode.

18. The method according to claim 17, wherein the slits correspond to the plurality of second auxiliary electrodes.

19. The method according to claim 17, wherein the liquid crystal layer has a symmetric alignment with respect to the protrusion and the slit.

20. The method according to claim 16, further comprising forming a connecting electrode connecting the first auxiliary electrode to another first auxiliary electrode under the adjacent data line.

21. The method according to claim 16, further comprising:
   forming a black matrix layer on the second substrate;
   forming a color filter layer on the black matrix layer; and
   forming a common electrode on the color filter layer.

22. The method according to claim 16, wherein the pixel region is divided into a plurality of domains depending on numbers of the second auxiliary electrodes and the protrusions.

23. The method according to claim 22, wherein the number of second auxiliary electrodes are at least two and the number of protrusions are at least three.

24. The method according to claim 23, wherein the pixel region has at least six domains.

25. The method according to claim 22, wherein the gate line induces a fringe field to form abnormal electric fields in the domains near the upper and lower ends of the pixel region.

26. The method according to claim 16, wherein the first auxiliary electrode becomes a repair line when the data line is broken.

27. The method according to claim 26, wherein a connection between the first auxiliary electrode under the broken data line and another first auxiliary electrode under the adjacent data line to the broken data line is cut off by cutting a portion of the second auxiliary electrode.

28. The method according to claim 16, wherein the first and second auxiliary electrodes are of the same material as the gate line.

29. The method according to claim 16, wherein the first and second auxiliary electrodes are formed one of a conductive metal material from the group consisting of aluminum (Al), aluminum alloys, chromium (Cr), molybdenum (Mo), tungsten (W) and copper (Cu).

30. The method according to claim 16, wherein the protrusion includes one of organic insulating material and photosensitive organic insulating material.

31. A liquid crystal display device, comprising:
a first substrate having a plurality of pixel regions, the pixel region having first and second regions;
a plurality of gate and data lines crossing each other on the first substrate;
a thin film transistor having a gate electrode, a semiconductor layer, a source electrode and a drain electrode at a crossing portion of the gate and data lines;
an auxiliary electrode having a plurality of horizontal electrodes and a vertical electrode, the horizontal electrodes being formed in the second region and spaced apart from each other, and the vertical electrode being formed under the data line and connecting the plurality of horizontal electrodes;
a pixel electrode in the pixel region, the pixel electrode having slits corresponding to the horizontal electrodes;
a black matrix layer on a second substrate;
a color filter layer on the black matrix layer;
a common electrode on the color filter layer; and
a protrusion on the common electrode, the protrusion being formed in a diagonal direction at a space between the slits.

32. The device according to claim 31, wherein the drain electrode is extended in a horizontal direction to the gate line.

33. The device according to claim 31, wherein the source electrode has a U-shape and the drain electrode is spaced apart from the source electrode.

34. The device according to claim 31, wherein the second region is divided into a plurality of domains.

35. The device according to claim 34, wherein each domain has a symmetric liquid crystal alignment with respect to the protrusion and the slit.

36. The device according to claim 31, wherein the gate line forms a fringe field in the first region.

* * * * *